US009553931B2

(12) United States Patent
Komura et al.

(10) Patent No.: US 9,553,931 B2
(45) Date of Patent: Jan. 24, 2017

(54) TRAIN-INFORMATION MANAGING APPARATUS

(75) Inventors: Tetsuo Komura, Tokyo (JP); Shogo Tatsumi, Tokyo (JP); Shingo Honda, Tokyo (JP); Yusuke Ishimaru, Tokyo (JP); Toshiko Kadono, Tokyo (JP); Takashi Miyauchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 131 days.

(21) Appl. No.: 14/370,493

(22) PCT Filed: Jan. 4, 2012

(86) PCT No.: PCT/JP2012/050039
§ 371 (c)(1),
(2), (4) Date: Jul. 30, 2014

(87) PCT Pub. No.: WO2013/102998
PCT Pub. Date: Jul. 11, 2013

(65) Prior Publication Data
US 2014/0376554 A1 Dec. 25, 2014

(51) Int. Cl.
*H04L 12/28* (2006.01)
*H04L 29/08* (2006.01)
(Continued)

(52) U.S. Cl.
CPC ......... *H04L 67/125* (2013.01); *B61L 15/0036* (2013.01); *B61L 15/0072* (2013.01);
(Continued)

(58) Field of Classification Search
CPC ............... H04L 12/00–12/02; B61L 15/00; B61L 15/0018; B61L 15/0045; B61L 15/0054; B61L 15/0063; B61L 15/0072; B61L 2210/00; B61L 15/002; B61L 15/0036; B61L 2240/10; B61L 2027/005
(Continued)

(56) References Cited

U.S. PATENT DOCUMENTS

| 5,353,413 A | 10/1994 | Novakovich et al. |
| 2003/0072271 A1* | 4/2003 | Simmons et al. ............ 370/255 |

(Continued)

FOREIGN PATENT DOCUMENTS

| EP | 1010602 A1 | 6/2000 |
| EP | 1065128 A1 | 1/2001 |

(Continued)

OTHER PUBLICATIONS

Extended European Search Report dated Jul. 30, 2015, issued by the European Patent Office in the corresponding European Application No. 12864367.3. (7 pages).
(Continued)

*Primary Examiner* — Andrew Chriss
*Assistant Examiner* — Kenan Cehic
(74) *Attorney, Agent, or Firm* — Buchanan Ingersoll & Rooney PC

(57) ABSTRACT

A train-information managing apparatus receives a series of control information attached to serial numbers, which are transmitted from a central apparatus, in order of the transmission and carries out control in the order, and even when the central apparatus is changed or the serial numbers are reset, prevents a blank period of control from occurring. Therefore, when a reception serial number n included in received data is a preferential serial number (n≤M) and an old number $n_{prev}$, which is a serial number included in data received and stored last time, is a cyclic serial number ($n_{prev}$≥M+1), the train-information managing apparatus stores the received data.

9 Claims, 9 Drawing Sheets

(51) Int. Cl.
*B61L 15/00* (2006.01)
*B61L 25/02* (2006.01)
*H04L 29/06* (2006.01)
(52) U.S. Cl.
CPC ............ *B61L 25/028* (2013.01); *H04L 69/22* (2013.01); *H04L 67/12* (2013.01)
(58) Field of Classification Search
USPC ........ 370/381, 394, 400, 246, 307, 333, 254
See application file for complete search history.

(56) References Cited

U.S. PATENT DOCUMENTS

| | | | |
|---|---|---|---|
| 2004/0103113 | A1 | 5/2004 | Sato et al. |
| 2010/0004805 | A1 | 1/2010 | Denis et al. |
| 2010/0019103 | A1* | 1/2010 | Kane ................ B61C 17/12 246/186 |
| 2010/0107029 | A1 | 4/2010 | Kikuchi et al. |
| 2013/0054526 | A1* | 2/2013 | Di Vincenzo ................ 707/634 |
| 2015/0210302 | A1* | 7/2015 | Kraeling ............ B61L 15/0027 701/117 |

FOREIGN PATENT DOCUMENTS

| | | |
|---|---|---|
| EP | 1 536 594 A1 | 6/2005 |
| JP | 11-154891 A | 6/1999 |
| JP | 2001-286001 A | 10/2001 |
| JP | 2003-137097 A | 5/2003 |
| JP | 2003-218876 A | 7/2003 |
| JP | 2004-172943 A | 6/2004 |
| JP | 2005-027368 A | 1/2005 |
| JP | 2005-039783 A | 2/2005 |
| JP | 2005-159604 A | 6/2005 |
| JP | 2006-148871 A | 6/2006 |
| JP | 2008-302780 A | 12/2008 |
| JP | 2009-267772 A | 11/2009 |
| JP | 2010-109530 A | 5/2010 |
| JP | 2010-252415 A | 11/2010 |
| WO | 2007/118837 A1 | 10/2007 |

OTHER PUBLICATIONS

International Search Report (PCT/ISA/210) mailed on Jan. 31, 2012, by the Japanese Patent Office as the International Searching Authority for International Application No. PCT/JP2012/050039.
Written Opinion (PCT/ISA/237) mailed on Jan. 31, 2012, by the Japanese Patent Office as the International Searching Authority for International Application No. PCT/JP2012/050039.
Chinese Office Action dated Jul. 6, 2016 issued in corresponding Chinese Patent Appln. No. 201280065940.8, with English translation (12 pages).

* cited by examiner

TRAIN-INFORMATION MANAGING APPARATUS

FIELD

The present invention relates to a train-information managing apparatus.

BACKGROUND

A train-information managing apparatus can collect and manage state data of devices mounted on cars of a train and individually control the operations of the devices.

The train-information managing apparatus generally includes central apparatuses and terminal apparatuses. The central apparatuses are mounted on a head car and a tail car of the train. The terminal apparatuses are respectively mounted in the other intermediate cars. The central apparatuses and the terminal apparatuses are connected to each other by a trunk transmission line disposed among the cars. The central apparatuses and the terminal apparatuses collect and manage state data of the devices in the cars on which the apparatuses are respectively mounted. The central apparatuses and the terminal apparatuses transmit and receive the collected to state data through inter-car communication via the trunk transmission line and share the data with each other. For example, Patent Literature 1 describes a configuration example in which a central apparatus is mounted on a head car of a train and terminal apparatuses are mounted on the other cars.

The central apparatuses are connected to a master controller and transmit, to the terminal apparatuses, control information (e.g., power running notch information and brake notch information) input from the master controller. The terminal apparatuses transmit the received control information to control target devices. The control target devices operate according to the received control information.

Specifically, the central apparatuses transmit the control information to the terminal apparatuses at a fixed cycle (e.g., a cycle T1=200 msec). On the other hand, the terminal apparatuses need to receive the control information transmitted from the central apparatuses in order and carry out control in that order. For example, when respective kinds of control information are transmitted from the central apparatuses in the order of deceleration 8 notches, deceleration 2 notches, deceleration 1 notch, and acceleration 1 notch, the terminal apparatuses need to receive these kinds of control information in this order and carry out control indicated by the control information in this order.

In the conventional train-information managing apparatus, for example, to enable the terminal apparatuses and the central apparatus in the tail car to receive control information, which is transmitted by the central apparatus in the head car in order, in the order of the transmission, the central apparatus in the head car transmits transmission data with serial numbers given thereto. As the serial numbers, for example, 1 to N (N is a natural number larger than 1) can be used in an ascending order and cyclically. For example, when the central apparatus in the head car transmits respective kinds of control information in the order of deceleration 8 notches, deceleration 2 notches, deceleration 1 notch, and acceleration 1 notch, the central apparatus creates transmission data in which a serial number "1" is given to the control information of the deceleration 8 notches, creates transmission data in which a serial number "2" is given to the control information of the deceleration 2 notches, creates transmission data in which a serial number "3" is given to the control information of the deceleration 1 notch, and creates transmission data in which a serial number "4" is given to the control information of the acceleration 1 notch. Consequently, the reception side can check the transmission order set by the transmission side and carry out control without causing a reversal of the order.

CITATION LIST

Patent Literature

Patent Literature 1: Japanese Patent Application Laid-Open No. 2003-137097

SUMMARY

Technical Problem

When a formation is connected, at least one of the central apparatuses in both the end cars starts to operate as a terminal apparatus. A new central apparatus starts serial numbering. When the formation is separated, a terminal apparatus in a car in a separating place starts to operate as a central apparatus and a new central apparatus starts serial numbering. When a central apparatus fails, a terminal apparatus in a car adjacent to a car mounted with the central apparatus can start serial numbering in place of the central apparatus. Further, when the central apparatus recovers from the failure, the central apparatus starts serial numbering again in place of the terminal apparatus. In all of these cases, the central apparatus or the terminal apparatus that starts serial numbering anew starts the serial numbering from "1", which is a first number used at the start of the serial numbering, irrespective of continuity of serial numbers used immediately before the start.

In this case, for example, when the terminal apparatus receives control information attached to a serial number "1" after receiving a serial number "30" immediately before receiving the control information, because the order of the serial numbers is reversed from "30" to "1", the terminal apparatus discards the control information attached to the serial number "1" and does not use the control information for control. The terminal apparatus carries out the same processing until the terminal apparatus receives control information attached to a serial number "31" or larger. While the processing is carried out, a blank period of control occurs. Such a blank period of control is longer as a number of a serial number used immediately before the serial number is reset is larger. This is undesirable in terms of car control.

The present invention has been devised in view of the above, and it is an object of the present invention to provide a train-information managing apparatus that can receive a series of control information attached to serial numbers, which are transmitted from a central apparatus, in order of the transmission and carry out control in the order, and even when the central apparatus is changed and the serial numbers are reset, prevent a blank period of control from occurring.

Solution to Problem

The present invention is directed to a train-information managing apparatus that achieves the object. The train-information managing apparatus includes central apparatuses mounted on each car at both ends of a formation of a train; terminal apparatuses mounted on each intermediate car of the formation; and a trunk transmission line that communicatively connects the central apparatuses and the terminal apparatuses. When one of the central apparatuses transmits data including its own car information to the other central apparatus side at a fixed cycle via the trunk transmission line, only the first time after a start-up of the one central apparatus, the one central apparatus gives first serial numbers including a plurality of numbers, order of which is specified in advance, to the data in order according to transmission order. After all of the first serial numbers are used, the one central apparatus gives second serial numbers including a plurality of numbers specified in the order and numbers later than the first serial numbers to the data in order according to the transmission order. After the second serial numbers are used till a last number, the one central apparatus returns to a first number again and gives the second serial numbers to the data in order. When a serial number included in data received from the terminal apparatus of an adjacent car on the central apparatus side or from the central apparatus is the first serial number and a serial number included in data received and stored last time is the second serial number, the terminal apparatuses store the received data. When a serial number included in data received from the terminal apparatus of an adjacent car on the central apparatus side is the first serial number and a serial number included in data received and stored last time is the second serial number, the other central apparatus stores the received data.

Advantageous Effects of Invention

The present invention produces an effect that it is possible to provide a train-information managing apparatus that can receive a series of control information attached to serial numbers, which are transmitted from a central apparatus, in order of the transmission and carry out control in the order, and even when the central apparatus is changed and serial numbers are reset, prevent a blank period of control from occurring.

DESCRIPTION OF EMBODIMENTS

An embodiment of a train-information managing apparatus according to the present invention is explained in detail below with reference to the drawings. Note that the present invention is not limited by the embodiment.

Embodiment

Figure 1:
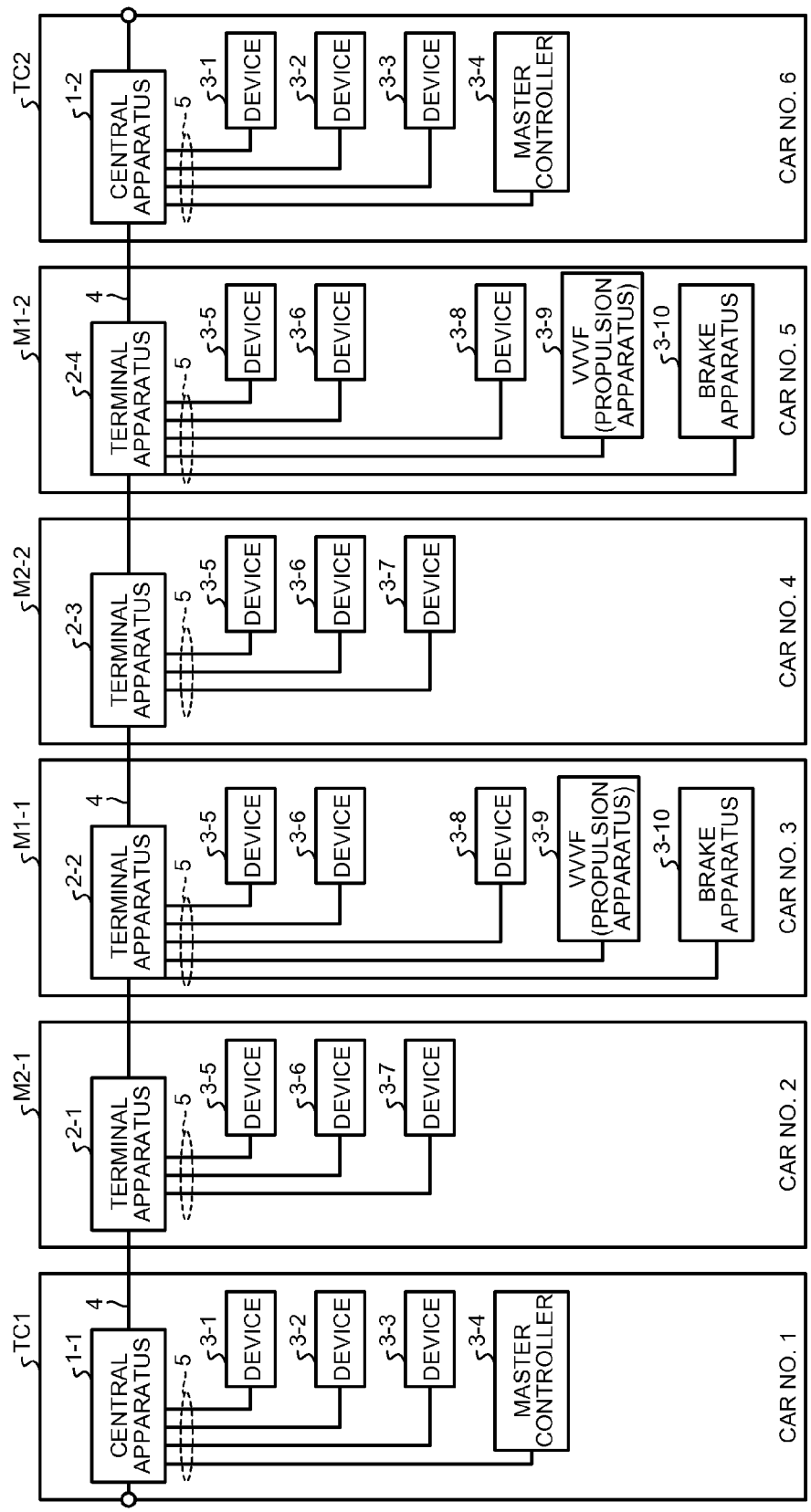
FIG. 1 is a diagram of an example of a formation of a train mounted with a train-information managing apparatus according to an embodiment.

FIG. 1 is a diagram of an example of a formation of a train mounted with a train-information managing apparatus according to this embodiment. In FIG. 1, the formation of the train includes, for example, six cars, specifically, cars TC1, M2-1, M1-1, M2-2, M1-2, and TC2, corresponding to a car No. 1 to a car No. 6 respectively. In this case, the car No. 1 is a head car and the car No. 6 is a tail car. Note that it goes without saying that this embodiment can be applied to a formation of any number of cars. This formation can be connected or separated.

Central apparatuses of the train-information managing apparatus (hereinafter simply referred to as "central apparatuses") 1-1 and 1-2 are respectively mounted on the cars TC1 and TC2, which are the cars at both the ends of the formation. Terminal apparatuses of the train-information managing apparatus (hereinafter simply referred to as "terminal apparatuses") 2-1, 2-2, 2-3, and 2-4 are respectively mounted on the cars M2-1, M1-1, M2-2, and M1-2, which are intermediate cars. The train-information managing apparatus in this embodiment includes the central apparatuses 1-1 and 1-2 and the terminal apparatuses 2-1 to 2-4. The central apparatuses 1-1 and 1-2 and the terminal apparatuses 2-1 to 2-4 are communicatively connected to each other via a trunk transmission line (an inter-car transmission line) 4 disposed among the cars. Specifically, the central apparatuses 1-1 and 1-2 and the terminal apparatuses 2-1 to 2-4 are connected in a daisy chain shape.

The train TC1 includes the central apparatus 1-1, devices 3-1 to 3-3 respectively connected to the central apparatus 1-1 via branch transmission lines (intra-car transmission lines) 5, and a master controller 3-4 connected to the central apparatus 1-1 via the branch transmission line 5.

The branch transmission lines 5 are communication paths disposed in a car. The central apparatus 1-1 transmits control information for respectively controlling the devices 3-1 to 3-3 and acquires device information (state data) respectively from the devices 3-1 to 3-3. The master controller 3-4 is controlled and managed by the central apparatus 1-1 in the same manner as the devices 3-1 to 3-3. The master controller 3-4 transmits, to the central apparatus 1-1, control information such as power running notch information (acceleration information) and brake notch information (deceleration information) input from a motorman's cab.

The car M2-1 includes the terminal apparatus 2-1 and devices 3-5 to 3-7 respectively connected to the terminal apparatus 2-1 via the branch transmission lines 5. The terminal apparatus 2-1 transmits control information for respectively controlling the devices 3-5 to 3-7 and acquires device information (state data) respectively from the devices 3-5 to 3-7.

The car M1-1 includes the terminal apparatus 2-2, devices 3-5, 3-6, and 3-8 respectively connected to the terminal apparatus 2-2 via the branch transmission lines 5, a VVVF (a propulsion apparatus) 3-9 connected to the terminal apparatus 2-2 via the branch transmission line 5, and a brake apparatus 3-10 connected to the terminal apparatus 2-2 via the branch transmission line 5. The VVVF 3-9 is a VVVF (Variable Voltage Variable Frequency) inverter. The VVVF 3-9 varies a voltage and a frequency of a motor (not shown in the figure) to perform control of car propulsion. The terminal apparatus 2-2 transmits control information for respectively controlling the devices 3-5, 3-6, and 3-8, the VVVF 3-9, and the brake apparatus 3-10 and acquires device information (state data) respectively from the devices 3-5, 3-6, and 3-8, the VVVF 3-9, and the brake apparatus 3-10.

The car M2-2 has a configuration same as the configuration of the car M2-1. That is, the car M2-2 includes the terminal apparatus 2-3 and the devices 3-5 to 3-7 respectively connected to the terminal apparatus 2-3 via the branch transmission lines 5. The terminal apparatus 2-3 has a function same as the function of the terminal apparatus 2-1.

The car M1-2 has a configuration same as the configuration of the car M1-1. That is, the car M1-2 includes the terminal apparatus 2-4, the devices 3-5, 3-6, and 3-8 respectively connected to the terminal apparatus 2-4 via the branch transmission line 5, the VVVF (the propulsion apparatus) 3-9 connected to the terminal apparatus 2-4 via the branch transmission line 5, and the brake apparatus 3-10 connected to the terminal apparatus 2-4 via the branch transmission line 5. The terminal apparatus 2-4 has a function same as the function of the terminal apparatus 2-2.

The car TC2 has a configuration same as the configuration of the car TC1. That is, the car TC2 includes the central apparatus 1-2, the devices 3-1 to 3-3 respectively connected to the central apparatus 1-2 via the branch transmission lines (the intra-car transmission lines) 5, and the master controller 3-4 connected to the central apparatus 1-2 via the branch transmission line 5. The central apparatus 1-2 has a function same as the function of the central apparatus 1-1.

Note that, in the following explanation, when simply described as devices 3, the devices 3 include not only the devices 3-1 to 3-3 and 3-5 to 3-8 but also the master controller 3-4, the VVVF 3-9, and the brake apparatus 3-10. The devices 3 collectively represent these devices. When simply described as terminal apparatuses 2, the terminal apparatuses 2 collectively represent the terminal apparatuses 2-1 to 2-4. When simply described as central apparatuses 1, the central apparatuses 1 collectively represent the central apparatuses 1-1 and 1-2.

The central apparatus 1 transmits state data collected concerning the devices 3 in the own car to the terminal apparatuses 2 and the other central apparatuses 1 via the trunk transmission line 4 as its own car information. In this case, the central apparatus 1 transmits, to the terminal apparatuses 2 and the other central apparatuses 1, its own car information (in this case, for example, car No. 1 information) including control information such as power running notch information or brake notch information input from the master controller 3-4. The terminal apparatus 2 transmits state data collected concerning the devices 3 in the own car to the other terminal apparatuses 2 and the central apparatuses 1 via the trunk transmission line 4 as own car information. In this way, the central apparatuses 1 and the terminal apparatuses 2 can share the state data of the cars of the train with each other. The central apparatuses 1 and the terminal apparatuses 2 manage, as train information, for example, the collected state data and information concerning traveling of the train.

Figure 11:
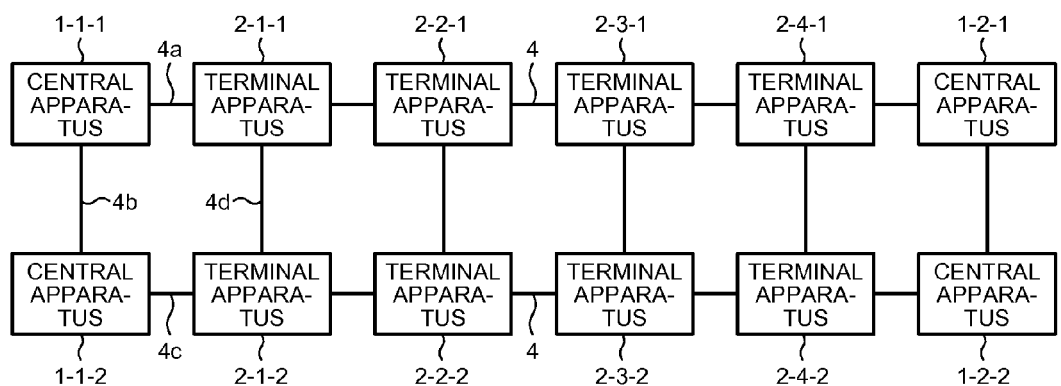
FIG. 11 is a diagram showing an example of a redundant system of the train-information managing apparatus.

Note that the train-information managing apparatus can be configured by a redundant system. In FIG. 11, the train-information managing apparatus configured by a double system is shown. That is, central apparatuses 1-1-1 and 1-2-1 and terminal apparatuses 2-1-1 to 2-4-1 indicate a first system and central apparatuses 1-1-2 and 1-2-2 and terminal apparatuses 2-1-2 to 2-4-2 indicate a second system. As transmission lines between the first system and the second system, for example, a transmission line 4b that connects the central apparatus 1-1-1 and the central apparatus 1-1-2 and a transmission line 4d that connects the terminal apparatus 2-1-1 and the terminal apparatus 2-1-2 are shown with reference signs attached thereto.

A specific method of data exchange among train-information managing apparatuses is explained. In this embodiment, transmission data transmitted among the cars is transmitted in order in one direction from the car No. 1 to the car No. 6 or transmitted in order in one direction from the car No. 6 to the car No. 1.

Figure 2:
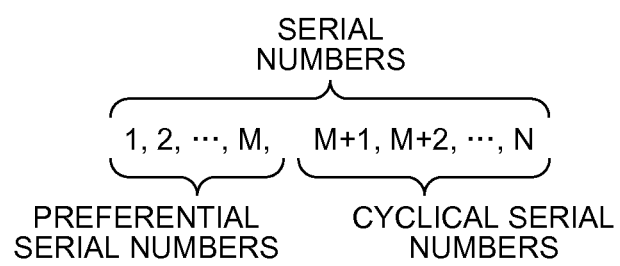
FIG. 2 is a diagram of an example of serial numbers used in the embodiment.
Figure 3:
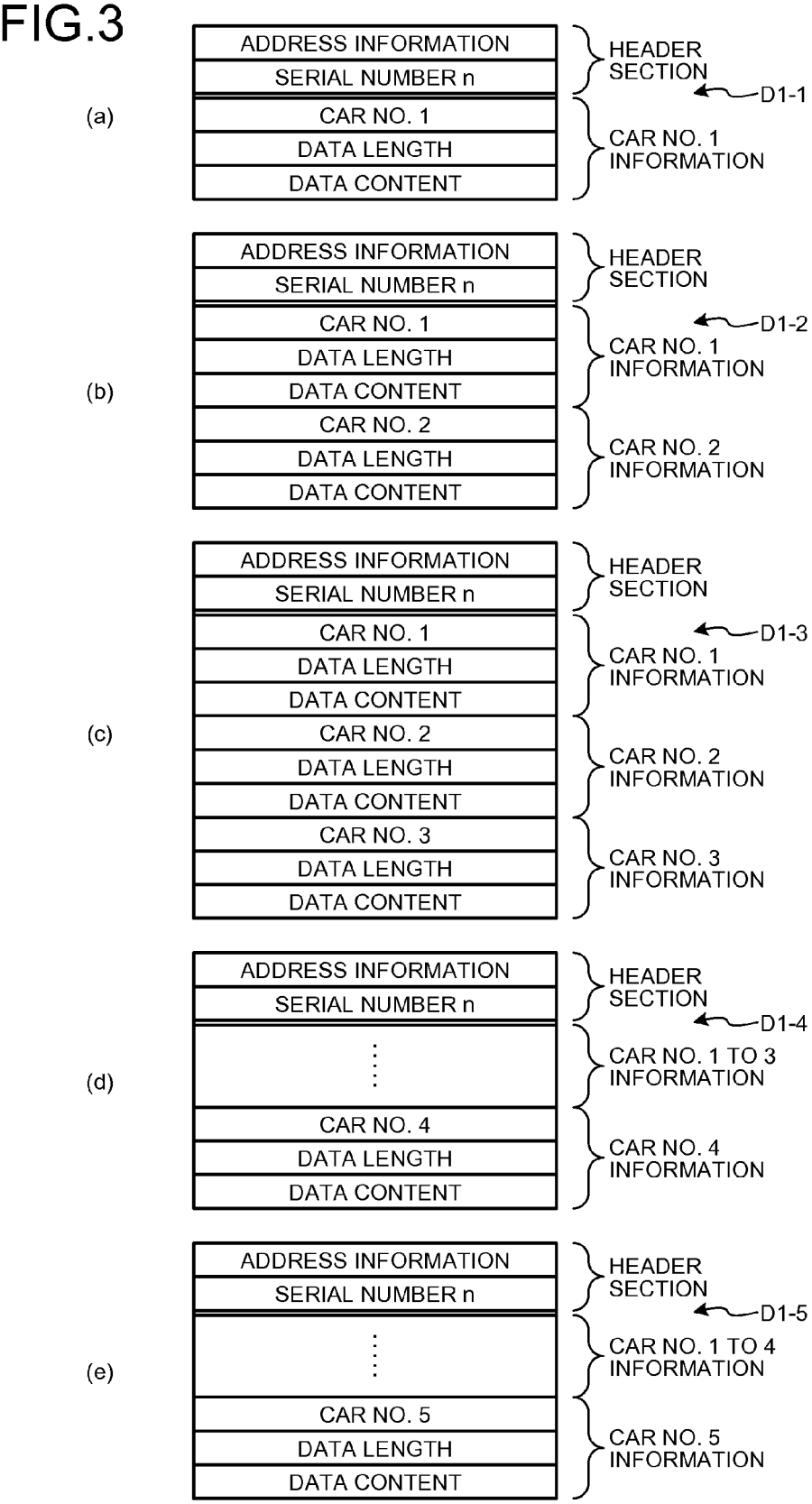
FIG. 3 is a diagram of an example of transmission data of the train-information managing apparatus.

First, the transmission of the transmission data in one direction from the car No. 1 to the car No. 6 is explained. FIG. 2 is a diagram of an example of serial numbers used in this embodiment. FIG. 3 is a diagram of an example of transmission data of the train-information managing apparatus.

In the car No. 1, the central apparatus 1-1 transmits own car information (in this case, car No. 1 information) to the car No. 2 via the trunk transmission line 4 as transmission data at a fixed cycle T1 (e.g., T1=20 msec). In this case, the central apparatus 1-1 transmits the transmission data with serial numbers given thereto. That is, the central apparatus 1-1 gives serial numbers to data transmitted to the tail car side.

As shown in FIG. 2, the serial numbers are, for example, 1 to N. N is a natural number larger than 1. However, actually, N is set to a sufficiently large value. During a start-up such as power-on or during reset, the central apparatus 1-1 starts use of serial numbers from "1", which is the smallest number, and thereafter uses numbers following "1" in an ascending order. When the central apparatus 1-1 uses the serial numbers up to "N", which is the largest number, the central apparatus 1-1 returns to M+1 (1<M<N) and thereafter repeatedly uses the numbers M+1 to N. That is, the numbers 1 to M are numbers used only in the first time after the start or after the reset of the central apparatus 1-1 and are not used thereafter as long as the central apparatus 1-1 is normally operating. In the following explanation, 1 to M are referred to as "preferential serial numbers" (first serial numbers). After using the preferential serial numbers, the central apparatus 1-1 cyclically uses M+1 to N. In the following explanation, M+1 to N are referred to as "cyclical serial numbers" (second serial numbers). Note that the serial numbers can be any serial numbers as long as the orders of the serial numbers are set according to a fixed rule. Therefore, more generally, order identification information can be given instead of the serial numbers. The serial numbers can be given in a descending order instead of the ascending order. In this embodiment, for example, decimal numbers are explained as an example. However, for example, hexadecimal numbers can be used.

In FIG. 3(a), an example of data D1-1 transmitted by the central apparatus 1-1 is shown. The data D1-1 includes a header section and car No. 1 information. The header section includes "address information" such as a transmission source address and a "serial number n". Here, n is any number among 1 to N. The car No. 1 information includes a car number information ("car No. 1") serving as an own car ID and "data length" and "data content" of a data body. The "data content" is control information such as power running notch information or brake notch information. Note that information other than the information shown in the figure can be respectively included in the header section and the car No. 1 information.

In the car No. 2, the terminal apparatus 2-1 receives the data D1-1 transmitted from the central apparatus 1-1 via the trunk transmission line 4, creates data D1-2 in which own car information (in this case, No. 2 car information) is added to the data D1-1, and transmits the data D1-2 to the car No. 3 via the trunk transmission line 4. In FIG. 3(*b*), an example of the data D1-2 transmitted by the terminal apparatus 2-1 is shown. The data D1-2 includes the car No. 2 information in addition to the data D1-1. The car No. 2 information includes a car number ("car No. 2") serving as an own car ID and "data length" and "data content" of a data body.

In the car No. 3, the terminal apparatus 2-2 receives the data D1-2 transmitted from the terminal apparatus 2-1 via the trunk transmission line 4, creates data D1-3 in which own car information (in this case, car No. 3 information) is added to the data D1-2, and transmits the data D1-3 to the car No. 4 via the trunk transmission line 4. In FIG. 3(*c*), an example of the data D1-3 transmitted by the terminal apparatus 2-2 is shown. The data D1-3 includes the car No. 3 information in addition to the data D1-2. The car No. 3 information includes a car number ("car No. 3") serving as an own car ID and "data length" and "data content" of a data body.

In the car No. 4, the terminal apparatus 2-3 receives the data D1-3 transmitted from the terminal apparatus 2-2 via the trunk transmission line 4, creates data D1-4 in which own car information (in this case, car No. 4 information) is added to the data D1-3, and transmits the data D1-4 to the car No. 5 via the trunk transmission line 4. In FIG. 3(*d*), an example of the data D1-4 transmitted by the terminal apparatus 2-3 is shown. The data D1-4 includes the car No. 4 information in addition to the data D1-3. The car No. 4 information includes a car number ("car No. 4") serving as an own car ID and "data length" and "data content" of a data body.

In the car No. 5, the terminal apparatus 2-4 receives the data D1-4 transmitted from the terminal apparatus 2-3 via the trunk transmission line 4, creates data D1-5 in which own car information (in this case, car No. 5 information) is added to the data D1-4, and transmits the data D1-5 to the car No. 6 via the trunk transmission line 4. In FIG. 3(*e*), an example of the data D1-5 transmitted by the terminal apparatus 2-4 is shown. The data D1-5 includes the car No. 5 information in addition to the data D1-4. The car No. 5 information includes a car number ("car No. 5") serving as an own car ID and "data length" and "data content" of a data body.

In the car No. 6, the central apparatus 1-2 receives the data D1-5 transmitted from the terminal apparatus 2-4 via the trunk transmission line 4. The central apparatus 1-2 can acquire all kinds of car information in the formation including the car No. 1 to No. 5 information included in the data D1-5 and own car information (car No. 6 information).

Transmission of transmission data in one direction from the car No. 6 to the car No. 1 is explained. A transmission method in this case is substantially the same as the transmission method in the transmission in one direction from the car No. 1 to the car No. 6. That is, in the car No. 6, the central apparatus 1-2 transmits own car information (in this case, car No. 6 information) to the car No. 5 via the trunk transmission line 4 as transmission data at the fixed cycle T1.

In this case, the central apparatus 1-2 transmits the transmission data with serial numbers given thereto. That is, the central apparatus 1-2 gives serial numbers to transmission data transmitted to the head car side. Note that the serial numbers are, for example, as explained with reference to FIG. 2. However, the serial numbers can be the same as the serial numbers used by the central apparatus 1-1 or can be different from the serial numbers used by the central apparatus 1-1.

Figure 4:
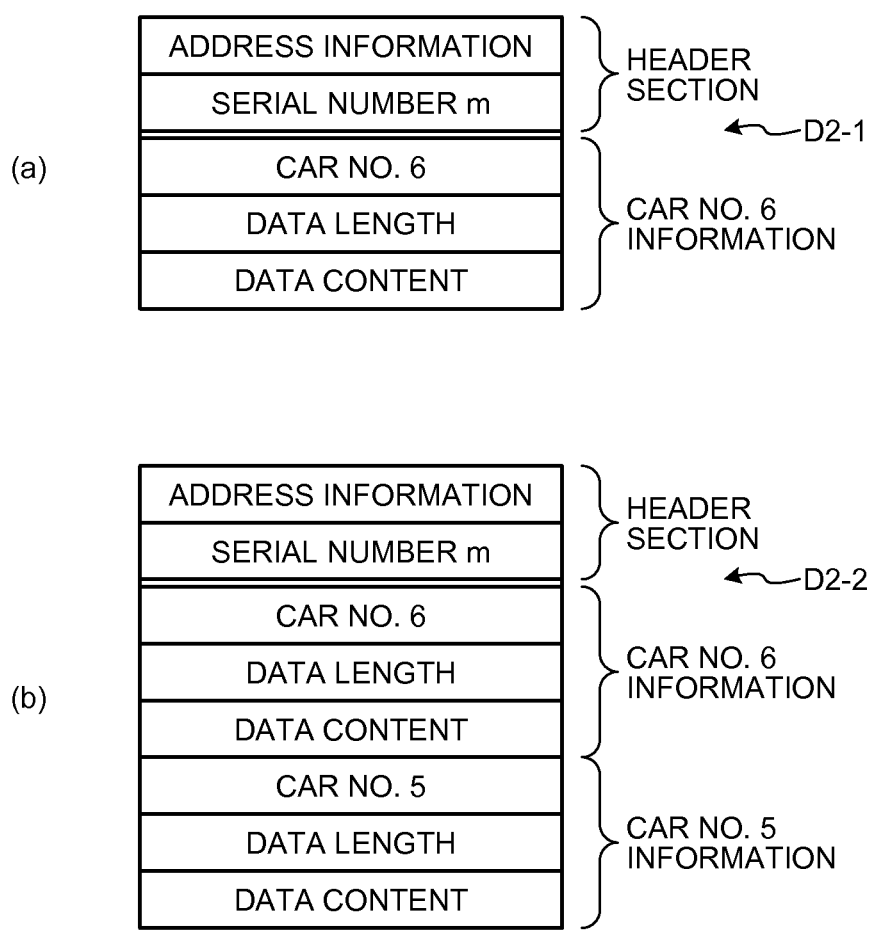
FIG. 4 is a diagram of an example of transmission data of the train-information managing apparatus.

FIG. 4 is a diagram of an example of transmission data of the train-information managing apparatus. In FIG. 4(*a*), an example of data D2-1 transmitted by the central apparatus 1-2 is shown. The data D2-1 includes a header section and car No. 6 information. The header section includes "address information" such as a transmission source address and a "serial number m". Here, m is any number among 1 to N. The car No. 6 information includes a car number information ("car No. 6") serving as an own car ID and "data length" and "data content" of a data body. Note that information other than the information shown in the figure can be respectively included in the header section and the car No. 6 information.

In the car No. 5, the terminal apparatus 2-4 receives the data D2-1 transmitted from the central apparatus 1-2 via the trunk transmission line 4, creates data D2-2 in which own car information (in this case, No. 5 car information) is added to the data D2-1, and transmits the data D2-2 to the car No. 4 via the trunk transmission line 4. The terminal apparatus 2-4 can acquire all kinds of car information in the formation including the car No. 6 information included in the data D2-1, the car No. 1 to No. 4 information included in the data D1-4, and own car information (car No. 5 information). In FIG. 4(*b*), an example of data D2-2 transmitted by the terminal apparatus 2-4 is shown. The data D2-2 includes the car No. 5 information in addition to the data D2-1. The car No. 5 information includes a car number information ("car No. 5") serving as an own car ID and "data length" and "data content" of a data body.

The same applies to the car No. 4 to the car No. 1. That is, in the car No. 4, the terminal apparatus 2-3 receives the data D2-2 transmitted from the terminal apparatus 2-4 via the trunk transmission line 4, creates data D2-3 in which own car information (in this case, No. 4 car information) is added to the data D2-2, and transmits the data D2-3 to the car No. 3 via the trunk transmission line 4. The terminal apparatus 2-3 can acquire all kinds of car information in the formation including the car No. 5 and car No. 6 information included in the data D2-2, the car No. 1 to No. 3 information included in the data D1-3, and own car information (car No. 4 information).

In the car No. 3, the terminal apparatus 2-2 receives the data D2-3 transmitted from the terminal apparatus 2-3 via the trunk transmission line 4, creates data D2-4 in which own car information (in this case, No. 3 car information) is added to the data D2-3, and transmits the data D2-4 to the car No. 2 via the trunk transmission line 4. The terminal apparatus 2-2 can acquire all kinds of car information in the formation including the car No. 4 to car No. 6 information included in the data D2-3, the car No. 1 and No. 2 information included in the data D1-2, and own car information (car No. 3 information).

In the car No. 2, the terminal apparatus 2-1 receives the data D2-4 transmitted from the terminal apparatus 2-2 via the trunk transmission line 4, creates data D2-5 in which own car information (in this case, No. 2 car information) is added to the data D2-4, and transmits the data D2-5 to the car No. 1 via the trunk transmission line 4. The terminal apparatus 2-1 can acquire all kinds of car information in the formation including the car No. 3 to car No. 6 information included in the data D2-4, the car No. 1 information included in the data D1-1, and own car information (car No. 2 information).

In the car No. 1, the central apparatus 1-1 receives the data D2-5 transmitted from the terminal apparatus 2-1 via the trunk transmission line 4. The central apparatus 1-1 can acquire all kinds of car information in the formation including the car No. 2 to car No. 6 information included in the data D2-5 and own car information (car No. 1 information).

Figure 5:
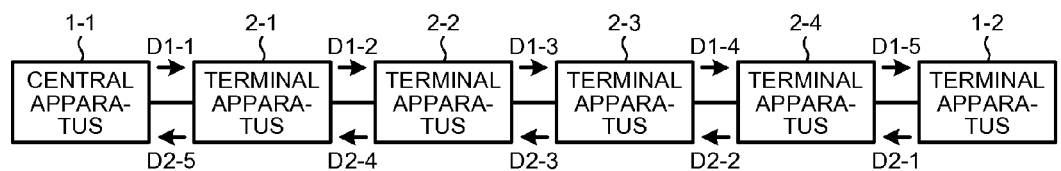
FIG. 5 is a diagram for explaining a transmission method for data among train-information managing apparatuses.

FIG. 5 is a diagram for explaining a transmission method for data among train-information managing apparatuses. In FIG. 5, a transmission direction of the data D1-1 to D1-5 transmitted in one direction from the car No. 1 to the car No. 6 is indicated by arrows. A transmission direction of the data D2-1 to D2-5 transmitted in one direction from the car No. 6 to the car No. 1 is indicated by arrows. In the formation, train-information managing apparatuses that create a header section and perform serial numbering are the central apparatuses 1-1 and 1-2 at the ends of the formation in principle.

Figure 6:
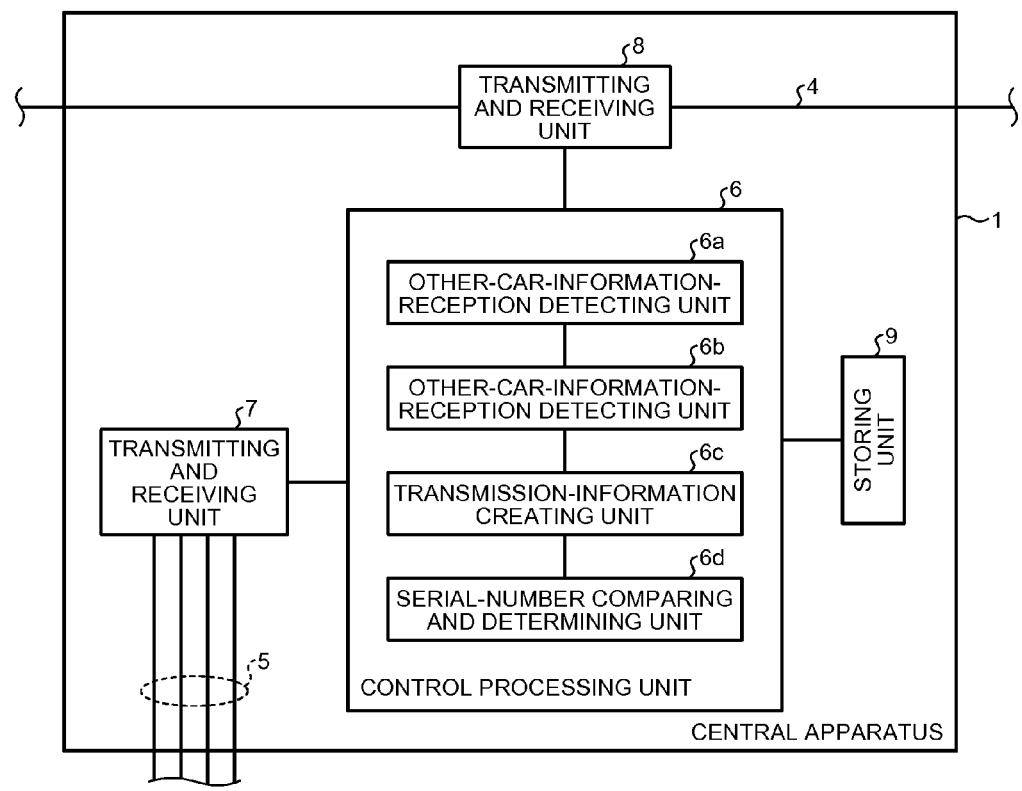
FIG. 6 is a diagram of an example of the internal configuration of a central apparatus.
Figure 7:
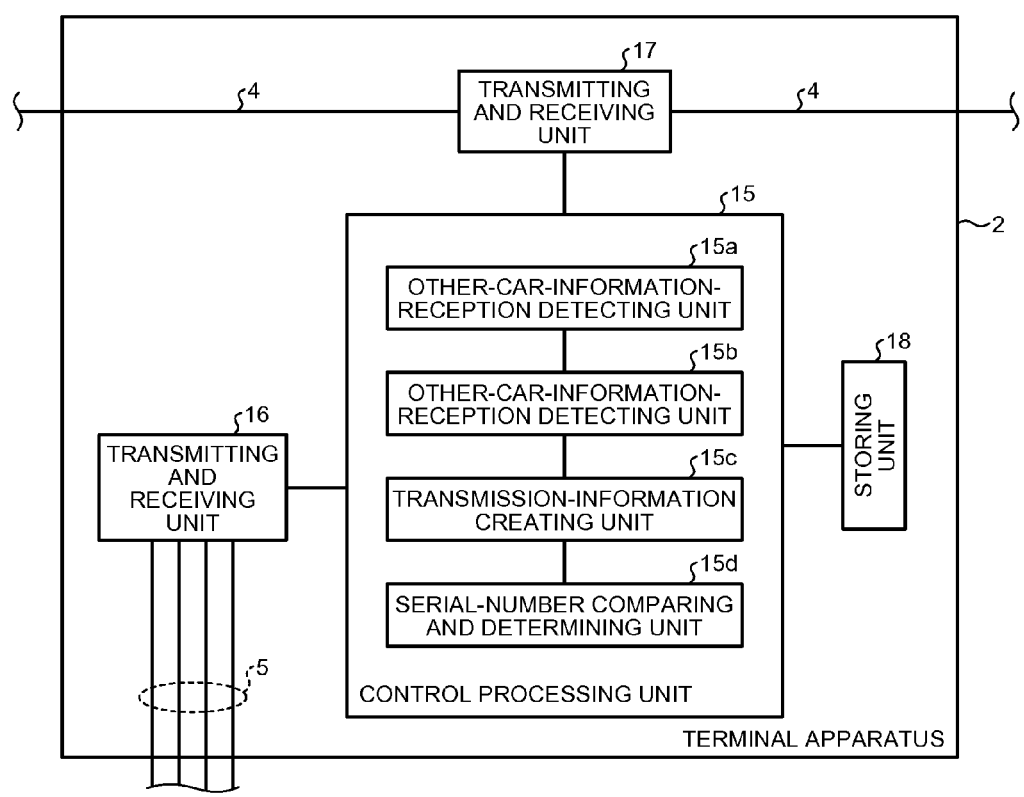
FIG. 7 is a diagram of an example of the internal configuration of a terminal apparatus.

The respective internal configurations of the central apparatus 1 and the terminal apparatus 2 are explained. FIG. 6 is a diagram of an example of the internal configuration of the central apparatus 1. FIG. 7 is a diagram of an example of the internal configuration of the terminal apparatus 2.

First, the configuration of the central apparatus 1 is explained. As shown in FIG. 6, the central apparatus 1 includes a control processing unit 6, a storing unit 9 connected to the control processing unit 6, a transmitting and receiving unit 8 connected to the control processing unit 6 and capable of performing transmission and reception of data between the cars via the trunk transmission line 4, and a transmitting and receiving unit 7 connected to the control processing unit 6 and capable of performing transmission and reception of data in the car via the branch transmission lines 5. The control processing unit 6 includes, as functional components thereof, other-car-information-reception detecting units 6a and 6b, a transmission-information creating unit 6c, and a serial-number comparing and determining unit 6d. The control processing unit 6 includes hardware such as a CPU and operates according to a control program for specifying a control operation of the control processing unit 6.

The other-car-information-reception detecting unit 6a detects whether transmission data from an adjacent car on the head car side is received by the transmitting and receiving unit 8. When the central apparatus 1 is the central apparatus 1-1 mounted on the head car, the other-car-information-reception detecting unit 6a does not detect reception of transmission data. On the other hand, when the central apparatus 1 is the central apparatus 1-2 mounted on the tail car, the other-car-information-reception detecting unit 6a detects whether transmission data from the car No. 5 is received by the transmitting and receiving unit 8.

The other-car-information-reception detecting unit 6b detects whether transmission data from an adjacent car on the tail car side is received by the transmitting and receiving unit 8. When the central apparatus 1 is the central apparatus 1-2 mounted on the tail car, the other-car-information-reception detecting unit 6b does not detect reception of transmission data. On the other hand, when the central apparatus 1 is the central apparatus 1-1 mounted on the head car, the other-car-information-reception detecting unit 6b detects whether transmission data from the car No. 2 is received by the transmitting and receiving unit 8.

The transmission-information creating unit 6c creates data to be transmitted to an adjacent car. When the central apparatus 1 is the central apparatus 1-1, the central apparatus 1 creates the data D1-1. When the central apparatus 1 is the central apparatus 1-2, the central apparatus 1 creates the data D2-1. The transmission-information creating unit 6c transmits the created data to the adjacent car via the transmitting and receiving unit 8. The transmission-information creating unit 6c has a serial numbering function and gives a serial number to the data to be transmitted.

The serial-number comparing and determining unit 6d compares a serial number given to data received from the adjacent car (hereinafter referred to as "reception serial number" and a serial number given to data used for control received from the adjacent car last time (hereinafter referred to as "old number") and determines, on the basis of a result of the comparison, whether the data given with the reception serial number is used for control or discarded. Note that details of the processing of the serial-number comparing and determining unit 6d are explained below.

The configuration of the terminal apparatus 2 is explained. As shown in FIG. 7, the terminal apparatus 2 includes a control processing unit 15, a storing unit 18 connected to the control processing unit 15, a transmitting and receiving unit 17 connected to the control processing unit 15 and capable of performing transmission and reception of data between the cars via the trunk transmission line 4, and a transmitting and receiving unit 16 connected to the control processing unit 15 and capable of performing transmission and reception of data in the car via the branch transmission lines 5 connected to the control processing unit 15. The control processing unit 15 includes, as functional components thereof, other-car-information-reception detecting units 15a and 15b, a transmission-information creating unit 15c, and a serial-number comparing and determining unit 15d. The control processing unit 15 includes hardware such as a CPU and operates according to a control program for specifying a control operation of the control processing unit 15.

The other-car-information-reception detecting unit 15a detects whether transmission data from an adjacent car on the head car side is received by the transmitting and receiving unit 17. When the terminal apparatus 2 is, for example, the terminal apparatus 2-1 mounted on the car No. 2, the other-car-information-reception detecting unit 15a detects whether transmission data from the car NO. 1 is received by the transmitting and receiving unit 17.

The other-car-information-reception detecting units 15b detects whether transmission data from an adjacent car on the tail car side is received by the transmitting and receiving unit 17. When the terminal apparatus 2 is, for example, the terminal apparatus 2-1 mounted on the car No. 2, the other-car-information-reception detecting unit 15b detects whether transmission data from the car NO. 3 is received by the transmitting and receiving unit 17.

The transmission-information creating unit 15c creates data to be transmitted to the adjacent car. When the terminal apparatus 2 is, for example, the terminal apparatus 2-1 mounted on the car No. 2, the terminal apparatus 2-1 creates the data D1-2 and D2-5. The transmission-information creating unit 15c transmits the created data to the adjacent car via the transmitting and receiving unit 17. Note that the transmission-information creating unit 6c has a serial numbering function like the transmission-information creating unit 15c. However, for example, except when the formation is separated and the terminal apparatus 2 is arranged at the formation end and functions as a central apparatus, the serial numbering function is in a disabled state and does not give a serial number to the data to be transmitted.

The serial-number comparing and determining unit 15*d* compares a serial number given to data received from the adjacent car (reception serial number) and a serial number given to data used for control received from the adjacent car last time (old number) and determines, on the basis of a result of the comparison, whether the data given with the reception serial number is used for control or discarded. When the terminal apparatus 2 is, for example, the terminal apparatus 2-1 mounted on the car No. 2, the serial-number comparing and determining unit 15*d* compares a reception number and an old number concerning the data D1-1 received from the car No. 1 and determines whether the data D1-1 is used for control or discarded. Similarly, the serial-number comparing and determining unit 15*d* compares a reception number and an old number concerning the data D2-4 received from the car No. 3 and determines whether the data D2-4 is used for control or discarded. Note that details of the processing of the serial-number comparing and determining unit 15*d* are explained below.

Processing for enabling or disabling the serial numbering function is explained. As explained above, the serial numbering function is enabled in the central apparatuses 1-1 and 1-2 of at the formation ends (both the end cars) in principle. However, for example, when the formation shown in FIG. 1 is connected to another formation (not shown in the figure) on the car TC1 side, the central apparatus 1-1 operates as a post-connection terminal apparatus. Therefore, the central apparatus 1-1 operating as a terminal apparatus after the connection needs to disable the serial numbering function and stops the serial numbering. For example, when the formation shown in FIG. 1 is separated between the cars M1-1 and M2-2, the terminal apparatuses 2-2 and 2-3 respectively operate as central apparatuses after the separation. Therefore, the terminal apparatuses 2-2 and 2-3 respectively operating as the central apparatuses after the separation need to enable the serial numbering function and start the serial numbering. Further, for example, when the central apparatus 1-1 fails or breaking of wire or the like occurs in the trunk transmission line 4 that connects the central apparatus 1-1 and the terminal apparatus 2-1, the terminal apparatus 2-1 is arranged at one end of a group of train-information managing apparatuses communicatively connected to one another in a daisy chain shape. Therefore, it is possible to perform setting to enable the serial numbering function and start the serial numbering. In all of these cases, a train-information managing apparatus that has been performing the serial numbering stops the serial numbering (header section creation) and another train-information managing apparatus starts the serial numbering (header section creation).

Figure 8:
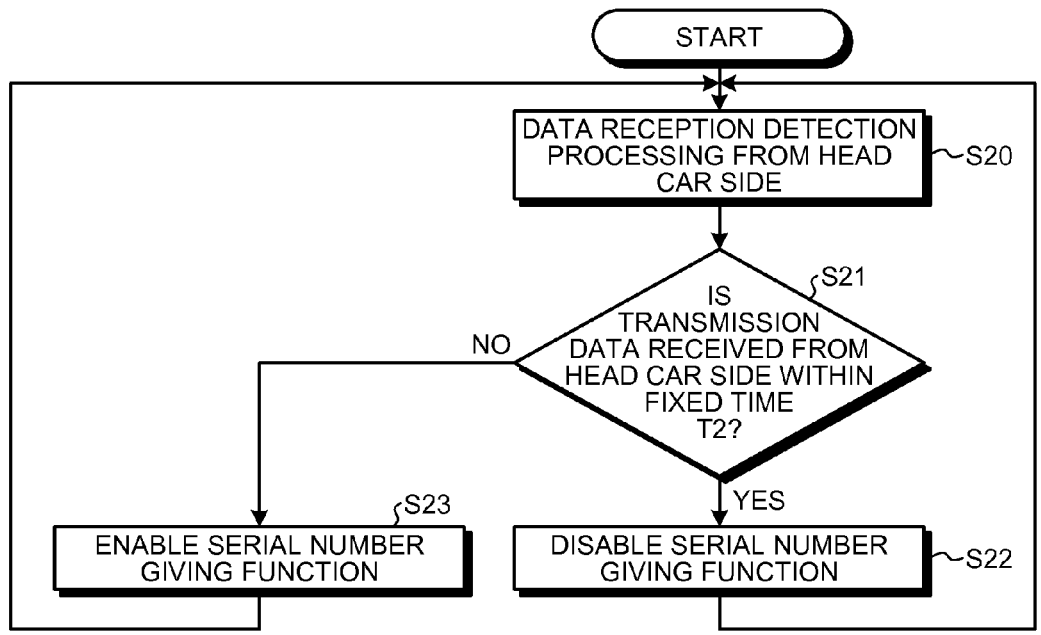
FIG. 8 is a flowchart for explaining determination processing performed by the train-information managing apparatus in enabling or disabling a serial numbering function of the train-information managing apparatus concerning data transmission from a head car side to a tail car side.
Figure 9:
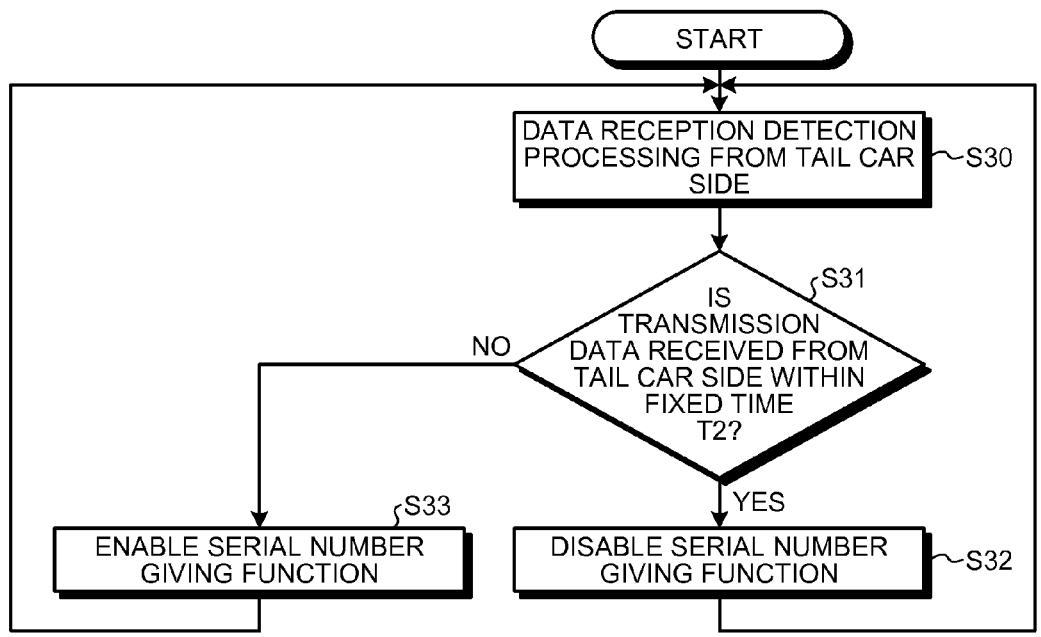
FIG. 9 is a flowchart for explaining determination processing performed by the train-information managing apparatus in enabling or disabling the serial numbering function of the train-information managing apparatus concerning data transmission from the tail car side to the head car side.

FIG. 8 is a flowchart for explaining determination processing performed by the train-information managing apparatus in enabling or disabling the serial numbering function of the train-information managing apparatus concerning data transmission from the head car side to the tail car side. FIG. 9 is a flowchart for explaining determination processing performed by the train-information managing apparatus in enabling or disabling the serial numbering function of the train-information managing apparatus concerning data transmission from the tail car side to the head car side. The train-information managing apparatus is the central apparatus 1 or the terminal apparatus 2.

As shown in FIG. 8, the train-information managing apparatus carries out data reception detection processing from the head car side (S20). For example, when the train-information managing apparatus is the central apparatus 1, the other-car-information-reception detecting unit 6*a* always detects presence or absence of transmission data from the adjacent car on the head car side. The other-car-information-reception detecting unit 6*a* outputs a detection result to the transmission-information creating unit 6*c*. For example, when the train-information managing apparatus is the terminal apparatus 2, the other-car-information-reception detecting unit 15*a* always detects presence or absence of transmission data from the adjacent car on the head car side. The other-car-information-reception detecting unit 15*a* outputs a detection result to the transmission-information creating unit 15*c*.

Subsequently, the train-information managing apparatus determines whether transmission data is received from the head car side within a fixed time T2 (S21). T2 is set to a value larger than T1. For example, T2 is a fixed cycle T2=30 msec. For example, when the train-information managing apparatus is the central apparatus 1, the transmission-information creating unit 6*c* determines, on the basis of the output of the other-car-information-reception detecting unit 6*a*, whether transmission data is received from the adjacent car on the head car side within the fixed time T2. For example, when the train-information managing apparatus is the terminal apparatus 2, the transmission-information creating unit 15*c* determines, on the basis of the output of the other-car-information-reception detecting unit 15*a*, whether transmission data is received from the adjacent car on the head car side within the fixed time T2.

As a result of the determination, when transmission data is received from the head car side within the fixed time T2 (Yes at S21), the train-information managing apparatus disables the serial numbering function of the train-information managing apparatus concerning data transmission from the head car side to the tail car side (S22). As a result of the determination, when transmission data is not received from the head car side within the fixed time T2 (No at S21), the train-information managing apparatus enables the serial numbering function of the train-information managing apparatus concerning data transmission from the head car side to the tail car side (S23). The processing explained above is repeatedly performed.

For example, when the train-information managing apparatus is the central apparatus 1-1, the central apparatus 1-1 does not receive data from the adjacent car on the head car side as long as the central apparatus 1-1 is mounted on the head car. Therefore, in this case, the transmission-information creating unit 6*c* maintains a state in which the serial numbering function of the train-information managing apparatus is enabled concerning transmission data from the head car side to the tail car side. However, when the formation is connected to another formation (not shown in the figure) on the car TC1 Side, the central apparatus 1-1 operates as a terminal apparatus after the connection. Therefore, the central apparatus 1-1 receives data from the head car side. In this case, the transmission-information creating unit 6*c* disables the serial numbering function of the train-information managing apparatus concerning data transmission from the head car side to the tail car side.

For example, when the train-information managing apparatus is the terminal apparatus 2-3, the terminal apparatus 2-3 usually receives the data D1-3 at the cycle of T1. Therefore, in this case, the transmission-information creating unit 15*c* maintains a state in which the sequential numbering function of the train-information managing apparatus is maintained concerning data transmission from the head car side to the tail car side. However, when the formation is separated between the cars M1-1 and M2-2, the terminal apparatus 2-3 operating as a central apparatus after the separation does not receive data from the head car side. Therefore, in this case, the transmission-information creating unit 15c disables the serial numbering function of the train-information managing apparatus concerning data transmission from the head car side to the tail car side.

For example, when the train-information managing apparatus is the terminal apparatus 2-1, when the central apparatus 1-1 fails or breaking of wire or the like occurs in the trunk transmission line 4 that connects the central apparatus 1-1 and the terminal apparatus 2-1, the terminal apparatus 2-1 does not receive data from the central apparatus 1-1. Therefore, in this case, the transmission-information creating unit 15c enables the serial numbering function of the train-information managing apparatus concerning data transmission from the head car side to the tail car side.

Note that, as shown in FIG. 11, when the train-information managing apparatus forms the double system, for example, when a deficiency occurs in a trunk transmission line 4a that connects the central apparatus 1-1-1 and the terminal apparatus 2-1-1, after acquiring car No. 1 information from the central apparatus 1-1-2 of the second system via a trunk transmission line 4c and the transmission line 4d in order, the terminal apparatus 2-1-1 adds a header section (including a serial number) created by the terminal apparatus 2-1-1 to the car No. 1 information and own car information and creates data D1-2.

As shown in FIG. 9, the train-information managing apparatus carries out data reception detection processing from the tail car side (S30). For example, when the train-information managing apparatus is the central apparatus 1, the other-car-information-reception detecting unit 6b always detects presence or absence of transmission data from the adjacent car on the tail car side. The other-car-information-reception detecting unit 6b outputs a detection result to the transmission-information creating unit 6c. For example, when the train-information managing apparatus is the terminal apparatus 2, the other-car-information-reception detecting unit 15b always detects presence or absence of transmission data from the adjacent car on the tail car side. The other-car-information-reception detecting unit 15b outputs a detection result to the transmission-information creating unit 15c.

Subsequently, the train-information managing apparatus determines whether data is received from the tail car side within the fixed time T2 (S31). T2 is as explained above. For example, when the train-information managing apparatus is the central apparatus 1, the transmission-information creating unit 6c determines, on the basis of the output of the other-car-information-reception detecting unit 6b, whether transmission data is received from the adjacent car on the tail car side within the fixed time T2. For example, when the train-information managing apparatus is the terminal apparatus 2, the transmission-information creating unit 15c determines, on the basis of the output of the other-car-information-reception detecting unit 15b, whether transmission data is received from the adjacent car on the tail car side within the fixed time T2.

When transmission data is received from the tail car side within the fixed time T2 as a result of the determination (Yes at S31), the train-information managing apparatus disables the serial numbering function of the train-information managing apparatus concerning the data transmission from the tail car side to the head car side (S32). When transmission data is not received from the tail car side within the fixed time T2 (No at S31), the train-information managing apparatus enables the serial numbering function of the train-information managing apparatus concerning the data transmission from the tail car side to the head car side (S33). The processing explained above is repeatedly performed.

For example, when the train-information managing apparatus is the central apparatus 1-2, the central apparatus 1-2 does not receive data from the adjacent car on the tail car side as long as the central apparatus 1-2 is mounted on the tail car. Therefore, in this case, the transmission-information creating unit 6c maintains a state in which the serial numbering function of the train-information managing apparatus concerning the data transmission from the tail car side to the head car side. However, when the formation is connected to another formation (not shown in the figure) on the car TC2 side, the central apparatus 1-2 operates as a terminal apparatus after the connection. Therefore, in this case, the transmission-information creating unit 6c disables the serial numbering function of the train-information managing apparatus concerning the data transmission from the tail car side to the head car side.

For example, when the train-information managing apparatus is the terminal apparatus 2-3, the terminal apparatus 2-3 usually receives the data D2-2 from the car No. 5 at the cycle T1. Therefore, in this case, the transmission-information creating unit 15c maintains a state in which the serial numbering function of the train-information managing apparatus is disabled concerning the data transmission from the tail car side to the head car side.

Figure 10:
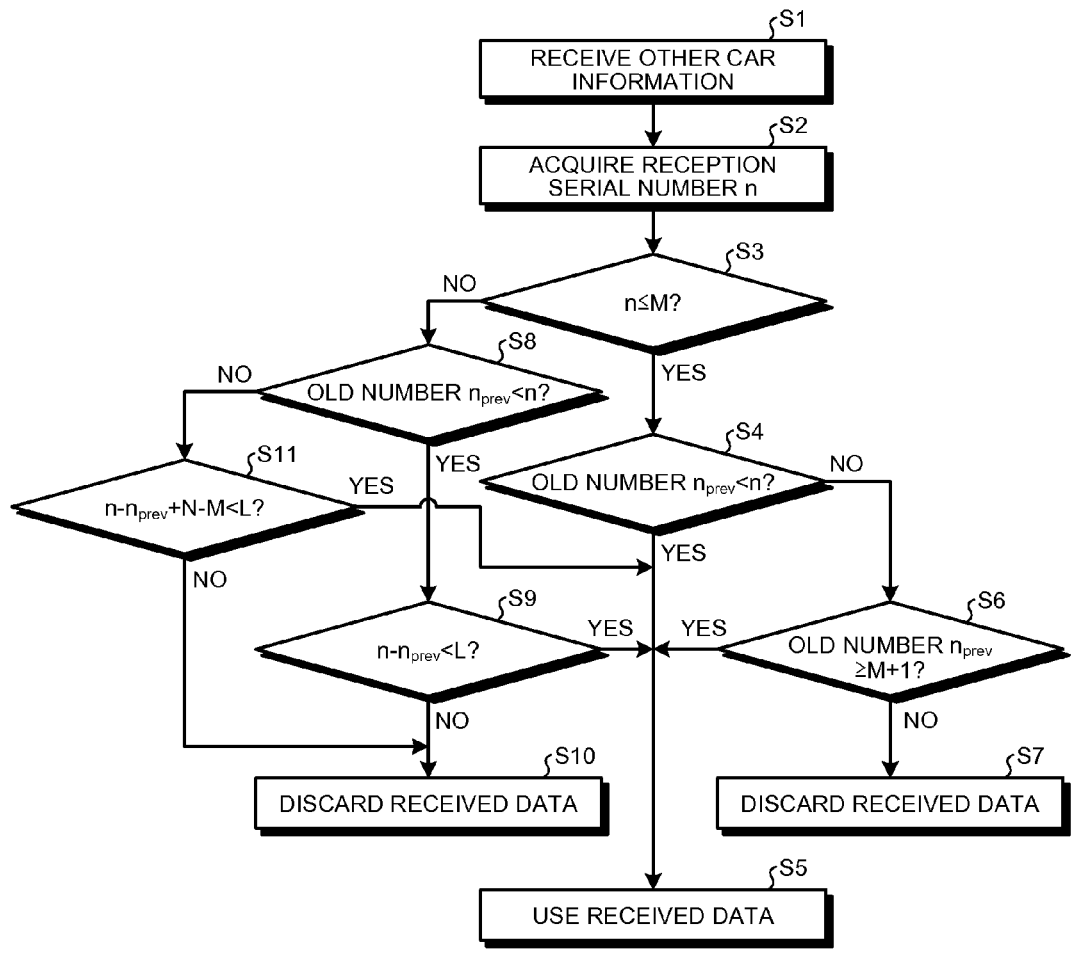
FIG. 10 is a flowchart for explaining a train information management method according to the embodiment.

An operation in this embodiment is explained with reference to FIG. 10. FIG. 10 is a flowchart for explaining a train-information managing apparatus according to this embodiment. Note that FIG. 10 is applied to both of the data transmission from the head car side to the tail car side and the data transmission from the tail car side to the head car side. In the following explanation, the data transmission from the head car side to the tail car side is explained as an example. The same explanation can be applied to the data transmission from the tail car side to the head car side.

First, the train-information managing apparatus receives other car information (S1). That is, the train-information managing apparatus receives data from the adjacent car on the head car side via the transmitting and receiving unit. For example, when the train-information managing apparatus is the central apparatus 1-2, the central apparatus 1-2 receives the data D1-5 from the terminal apparatus 2-4 of the car No. 5. For example, when the train-information managing apparatus is the terminal apparatus 2-1, the terminal apparatus 2-1 receives the data D1-1 from the central apparatus 1-1 of the car No. 1.

Subsequently, the train-information managing apparatus acquires a reception serial number (represented as n) from the received data (S2). For example, when the train-information managing apparatus is the central apparatus 1-2, the serial-number comparing and determining unit 6d acquires the reception serial number n out of the data D1-5. For example, when the train-information managing apparatus is the terminal apparatus 2-1, the serial-number comparing and determining unit 15d acquires the reception serial number n out of the data D1-1.

Subsequently, the train-information managing apparatus determines whether the reception serial number n is equal to or smaller than M (S3). M is as explained with reference to FIG. 2. For example, when the train-information managing apparatus is the central apparatus 1-2, the serial-number comparing and determining unit 6d determines whether $n \leq M$. For example, when the train-information managing apparatus is the terminal apparatus 2-1, the serial-number comparing and determining unit 15d determines whether n≤M. Note that, in processing explained below, an entity of the processing is the serial-number comparing and determining unit 6d. The entity of the processing is the serial-number comparing and determining unit 15d when the train-information managing apparatus is the terminal apparatus 2.

As a result of the determination at S3, when n≤M (Yes at S3), the train-information managing apparatus further determines whether the reception serial number n is larger than an old number (represented as $n_{prev}$) (S4). That is, the serial number received this time and a serial number received last time are compared. As a result of the determination at S4, when $n_{prev}$<n (Yes at S4), the train-information managing apparatus uses received data (S5). That is, when the reception serial number n is a preferential serial number (n≤M), the old number $n_{prev}$ is also a preferential serial number ($n_{prev}$<n), and the reception serial number is larger than the old number ($n_{prev}$<n), the received data is received in the order of transmission. Therefore, the train-information managing apparatus stores the received data in the storing unit as car information and uses the received data for control.

On the other hand, as a result of the determination at S4, when $n_{prev}$>n (No at S4), the train-information managing apparatus further determines whether the old number $n_{prev}$ is equal to or larger than M+1 (S6). As a result of the determination at S6, when the old number $n_{prev}$≥M+1 (Yes at S6), the train-information managing apparatus uses received data (S5). That is, when the reception serial number n is a preferential serial number (n≤M) and the old number $n_{prev}$ is a cyclical serial number (the old number $n_{prev}$≥M+1), the train-information managing apparatus determines that reversal of the serial numbers is caused because the serial numbers are reset because of, for example, connection or separation of the formation, stores the received data in the storing unit as car information, and uses the received data for control. On the other hand, as a result of the determination at S6, when the old number $n_{prev}$≤M (No at S6), the train-information managing apparatus discards the received data (S7). That is, when the reception serial number n is a preferential serial number (n≤M), the old number $n_{prev}$ is also a preferential serial number (the old number $n_{prev}$≤M), and the reception serial number is smaller than the old number ($n_{prev}$>n), although data reception is performed after reset of the serial numbers, the received data is not received in the order of transmission. Therefore, the train-information managing apparatus discards the received data without using the received data.

As a result of the determination at S3, when n≥M+1 (No at S3), the train-information managing apparatus further determines whether reception serial number n is larger than the old number $n_{prev}$ (S8). However, it is assumed that $n_{prev}$≥M+1. That is, in the following explanation, both of the reception serial number n and the old number $n_{prev}$ are cyclical serial numbers. Note that, when $n_{prev}$≤M, the old number $n_{prev}$ is a preferential serial number and the reception number n is a cyclical serial number. Therefore, received data is received in the order of transmission. The train-information managing apparatus stores the received data in the storing unit as car information and uses the received data for control.

As a result of the determination at S8, when $n_{prev}$<n (Yes at S8), the train-information managing apparatus further determines whether n-$n_{prev}$<L (S9). Here, L is a threshold set in advance. As a result of the determination at S9, when n-$n_{prev}$<L (Yes at S9), the train-information managing apparatus uses received data (S5). On the other hand, as a result of the determination at S9, when n-$n_{prev}$≥L (No at S9), the train-information managing apparatus discards the received data (S10). That is, only when both of the reception serial number n and the old number $n_{prev}$ are cyclical serial numbers and a difference (n-$n_{prev}$) between the reception serial number n and the old number $n_{prev}$ is smaller than the threshold L set in advance, the received data is used for control. This is because, in comparison of cyclical serial numbers, when the difference (n-$n_{prev}$) between the reception serial number n and the old number n is too large, it is likely to be difficult to determine an anterior-posterior relation of order. Such likelihood is eliminated by providing the threshold L.

On the other hand, as a result of the determination at S8, when $n_{prev}$>n (No at S8), the train-information managing apparatus further determines whether n-$n_{prev}$+N-M<L (S11). This is because, since the serial numbers are cyclically used, order cannot be decided only by comparison of magnitudes and it is decided an anterior-posterior relation of order according to a relation with a threshold. As a result of the determination at S11, when n-$n_{prev}$+N-M<L (Yes at S11), the train-information managing apparatus uses received data (S5). On the other hand, as a result of the determination at S11, when n-$n_{prev}$+N-M≥L (No at S11), the train-information managing apparatus discards the received data (S10).

Note that, in the above explanation, during power-on when the train-information managing apparatus is started, the old number $n_{prev}$ is set to, for example, 0. That is, the old number during power-on is set to a value smaller than a minimum serial number among preferential serial numbers.

As explained above, in this embodiment, when the reception serial number n, which is a serial number of latest received data, is a preferential serial number (n≤M) and the old number nprev, which is a serial number of data received last time, is a cyclical serial number (the old number nprev≥M+1), the train-information managing apparatus stores the latest received data in the storing unit as car information and uses the latest received data for control. That is, in this case, because the preferential serial number is received, the train-information managing apparatus determines that the serial numbers are reset because of connection or separation of the formation, a failure of a central apparatus, recovery from a failure of a central apparatus, a deficiency of the trunk transmission line 4, restart of a central apparatus, or the like and preferentially uses data given with the preferential serial number.

In this way, according to this embodiment, it is possible to provide a train-information managing apparatus capable of receiving a series of control information attached to serial numbers, which are transmitted from a central apparatus, in order of the transmission and carrying out control in the order and, even when, for example, the central apparatus 1 is changed and the serial numbers are reset, preventing a blank period of control from occurring.

INDUSTRIAL APPLICABILITY

As explained above, the present invention is useful as a train-information managing apparatus.

REFERENCE SIGNS LIST

1 Central apparatus
2, 2-1 to 2-4 Terminal apparatuses
3, 3-1 to 3-8 Devices
3-4 Master controller 3-9 VVVF (propulsion apparatus)
3-10 Brake apparatus
4, 4a, 4c Trunk transmission lines
4b, 4d Transmission lines
5 Branch transmission line
6, 15 Control processing units
6a, 6b, 15a, 15b Other-car-information-reception detecting units
6c, 15c Transmission-information creating units
6d, 15d Serial-number comparing and determining units
7, 8, 16, 17 Transmitting and receiving units
9, 18 Storing units

The invention claimed is:

1. A train-information managing apparatus comprising:
central apparatuses mounted on each car at both ends of a formation of a train, wherein the central apparatuses comprise a first central apparatus and a second central apparatus;
terminal apparatuses mounted on each intermediate car of the formation; and
a trunk transmission line that communicatively connects the central apparatuses and the terminal apparatuses,
wherein when the first central apparatus transmits data including its own car information to the second central apparatus at a fixed cycle via the trunk transmission line, only the first time after a start-up of the first central apparatus, the first central apparatus:
provides first serial numbers including a plurality of numbers which have an order specified in advance, to the data according to a transmission order,
wherein when all of the first serial numbers are used, provides second serial numbers, including a plurality of numbers specified in the order and numbers subsequent to the first serial numbers, to the data according to the transmission order, and
after the second serial numbers are used until a last number, returns to a first number in the second serial numbers and provides the second serial numbers to the data in order,
wherein when a serial number included in data received from a terminal apparatus of the terminal apparatuses of an adjacent car on the side of the first central apparatus or from the first central apparatus is one of the first serial numbers and the last stored serial number in the terminal apparatus is one of the second serial numbers, the terminal apparatus stores the data received, and
wherein when a serial number included in data received from the terminal apparatus of an adjacent car on the side of the first central apparatus is one of the first serial numbers and the last stored serial number is the second serial number, the second central apparatus stores the data received.

2. The train-information managing apparatus according to claim 1,
wherein when the serial number included in the data received from the terminal apparatus of the adjacent car on the side of the first central apparatus or from the first central apparatus is one of the first serial numbers and the last stored serial number in the terminal apparatus is one of the first serial numbers, the terminal apparatuses store the data received only when a serial number included in data received is subsequent to the last stored serial number, and otherwise discard the received data, and
wherein when the serial number included in the data received from the terminal apparatus of the adjacent car on the side of the first central apparatus is one of the first serial numbers and the last stored serial number is one of the first serial numbers, the second central apparatus stores the received data only when the serial number included in data received is subsequent to the last stored serial number, and otherwise discards the data received.

3. The train-information managing apparatus according to claim 2,
wherein when the serial number included in the data received from the terminal apparatus of the adjacent car on the side of the first central apparatus or from the first central apparatus is one of the second serial numbers, the last stored serial number is one of the second serial numbers, and the serial number included in the data received is subsequent to the last stored serial number, the terminal apparatuses store the data received when a difference between the serial number included in the data received and the last stored serial number is smaller than a threshold set in advance, and discard the data received when the difference is equal to or larger than the threshold, and
wherein when the serial number included in the data received from the terminal apparatus of the adjacent car on the side of the first central apparatus is one of the second serial numbers, the last stored serial number is one of the second serial numbers, and the serial number included in the data received is subsequent to the last stored serial number, the second central apparatus stores the data received when a difference between the serial number included in the data received and the last stored serial number is smaller than a threshold set in advance, and discards the data received when the difference is equal to or larger than the threshold.

4. The train-information managing apparatus according to claim 3,
wherein when the serial number included in the data received from the terminal apparatus of the adjacent car on the side of the first central apparatus or from the first central apparatus is one of the second serial numbers and the last stored serial number is one of the first serial numbers, the terminal apparatuses store the data received, and
wherein when the serial number included in the data received from the terminal apparatus of the adjacent car on the side of the first central apparatus is one of the second serial numbers and the last stored serial number is one of the first serial numbers, the second central apparatus stores the data received.

5. The train-information managing apparatus according to claim 1, wherein, after adding their own car information to the data received from the terminal apparatus of the adjacent car on the side of the first central apparatus or from the first central apparatus, the terminal apparatuses transmit the data to the terminal apparatus of the adjacent car on the side of the second central apparatus or to the second central apparatus.

6. The train-information managing apparatus according to claim 5, wherein, when the first central apparatus starts up according to connection or separation of the formation, the first central apparatus sets a serial number given to the data as the first serial number.

7. The train-information managing apparatus according to claim 6, wherein the first central apparatus i) detects whether transmission of data via the trunk transmission line is generated from an opposite side of the second central apparatus according to the connection of the formation, ii) maintains a function of giving the first or second serial number when data is not received from the opposite side within a predetermined period longer than the fixed cycle, and iii) disables the function of giving the first or second serial number when data is received from the opposite side within the predetermined period.

8. The train-information managing apparatus according to claim 6, wherein the terminal apparatuses i) detect whether transmission of data from the side of the first central apparatus via the trunk transmission line ends according to the separation of the formation, ii) enable a function of giving the first or second serial numbers when data is not received from the first central apparatus side within a predetermined period longer than the fixed cycle, (iii) give the first or second serial numbers to data including own car information to the second central apparatus side in the same manner as the first central apparatus, (iv) transmit the data at the fixed cycle via the trunk transmission line, and (v) disable the function of giving the first or second serial numbers when data is received from the side of the first central apparatus within the predetermined period.

9. The train-information managing apparatus according to claim 1, wherein the own car information includes power running notch information or brake notch information input from a master controller to the first central apparatus.

* * * * *